US012237722B2

(12) United States Patent
Schwenk et al.

(10) Patent No.: US 12,237,722 B2
(45) Date of Patent: Feb. 25, 2025

(54) LAMINATED ROTOR CORE FOR A ROTOR, AND METHOD FOR PRODUCING A LAMINATED ROTOR CORE

(71) Applicant: Schaeffler Technologies AG & Co. KG, Herzogenaurach (DE)

(72) Inventors: Wilfried Schwenk, Achern-Mösbach (DE); Michael Schlosser, Bietigheim (DE); Patrick Wisbar, Rastatt (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 275 days.

(21) Appl. No.: 17/639,756

(22) PCT Filed: Jul. 9, 2020

(86) PCT No.: PCT/DE2020/100601
§ 371 (c)(1),
(2) Date: Mar. 2, 2022

(87) PCT Pub. No.: WO2021/043354
PCT Pub. Date: Mar. 11, 2021

(65) Prior Publication Data
US 2022/0337106 A1    Oct. 20, 2022

(30) Foreign Application Priority Data
Sep. 2, 2019  (DE) .......................... 102019123433.6

(51) Int. Cl.
*H02K 1/27*   (2022.01)
*H02K 15/03*  (2006.01)

(52) U.S. Cl.
CPC ............... *H02K 1/27* (2013.01); *H02K 15/03* (2013.01)

(58) Field of Classification Search
CPC ............ H02K 1/27; H02K 15/03; H02K 1/30; H02K 2201/15; H02K 1/2766
See application file for complete search history.

(56) References Cited

U.S. PATENT DOCUMENTS

| 2013/0249345 A1 | 9/2013 | Kaiser et al. | |
|---|---|---|---|
| 2016/0094098 A1* | 3/2016 | Maekawa | H02K 1/27 310/156.01 |
| 2018/0254676 A1* | 9/2018 | Nigo | H02K 21/16 |

FOREIGN PATENT DOCUMENTS

| CN | 1929246 B | 3/2007 |
|---|---|---|
| CN | 102668343 B | 9/2012 |
| CN | 103325487 A | 9/2013 |
| CN | 207339463 | 5/2018 |
| CN | 108667172 B | 10/2018 |
| CN | 207939332 | 10/2018 |
| CN | 108988526 B | 12/2018 |

(Continued)

*Primary Examiner* — Thomas Truong
(74) *Attorney, Agent, or Firm* — Volpe Koenig (57) ABSTRACT

A laminated rotor core for a rotor of a permanently excited electric machine and to a method for producing same are provided. The laminated rotor core consists of a plurality of stacked lamination rings, each lamination ring consisting of a plurality of circular segments. Each circular segment has multiple receiving openings, which are arranged in a V-shaped manner relative to each other in pairs, for permanent magnets and multiple passages for respective fixing elements. The laminated rotor core is mounted on a holding disc using the fixing elements, which run in the passages of the laminated rotor core.

17 Claims, 5 Drawing Sheets

(56) References Cited

FOREIGN PATENT DOCUMENTS

| | | | |
|---|---|---|---|
| DE | 69204322 | 8/1995 | |
| DE | 102009052596 | 5/2011 | |
| DE | 102010005490 | 7/2011 | |
| DE | 102011018619 | 11/2011 | |
| DE | 102011115159 | 3/2013 | |
| DE | 102012019182 | 3/2013 | |
| DE | 102012019182 A1 * | 3/2013 | |
| DE | 102013000404 | 7/2013 | |
| DE | 102013204790 | 9/2013 | |
| DE | 102012006169 | 10/2013 | |
| DE | 102012006169 A1 * | 10/2013 | ........... H02K 1/2766 |
| DE | 102012006172 | 10/2013 | |
| DE | 102015206974 | 4/2016 | |
| DE | 102017201438 | 8/2018 | |
| DE | 102018107170 A1 | 10/2018 | |
| EP | 0500457 | 8/1992 | |
| EP | 2466732 | 6/2012 | |
| EP | 3306786 | 1/2019 | |
| JP | H08168222 | 6/1996 | |
| JP | 2005210790 | 8/2005 | |
| JP | 2012019623 | 1/2012 | |
| WO | 2008044420 A1 | 4/2008 | |
| WO | WO-2014208582 A1 * | 12/2014 | ............. H02K 1/276 |

* cited by examiner

Prior Art

Fig. 1

Prior Art

ND METHOD FOR PRODUCING A
LAMINATED ROTOR CORE FOR A ROTOR,
AND METHOD FOR PRODUCING A
LAMINATED ROTOR CORE

CROSS-REFERENCE TO RELATED
APPLICATIONS

This application is the U.S. National Phase of PCT Appln. No. PCT/DE2020/100601, filed Jul. 9, 2020, which claims priority from German Patent Application No. 10 2019 123 433.6, filed Sep. 2, 2019, the entire disclosures of which are incorporated by reference herein.

TECHNICAL FIELD

The disclosure relates to a laminated rotor core for a rotor of a permanently excited electric machine. The laminated rotor core consists of a large number of lamination rings. Each of the lamination rings consists of a number of circular segments. Each of the circular segments has a first end face with a connection system and a second end face with a complementary connection system in the circumferential direction.

The disclosure also relates to a method for producing a laminated rotor core for a rotor of a permanently excited electric machine.

BACKGROUND

The published German patent application DE 10 2009 052 596 A1 relates to a rotor of an electric machine, which is formed from individual segments. Each individual segment has a first part which, in the assembled state, is connected to a second corresponding part of the adjacent individual segment in a form-fitting manner, so that a self-supporting ring structure of the assembled rotor is formed in the circumferential direction. Each individual segment has an opening for a permanent magnet.

The published German patent application DE 10 2010 005 490 A1 discloses a rotor of an electric machine, which has individual segments and a rotor carrier. The individual segments are connected to the rotor carrier in a form-fitting manner.

The published German patent application DE 10 2011 018 619 A1 relates to a laminated core arrangement for a rotor of an electric machine, in particular a permanent magnet-excited synchronous machine of a vehicle, with a plurality of laminated core layers stacked on top of one another. Each laminated core layer consists of at least two laminated core parts in the shape of a circular segment, which are connected to one another in the circumferential direction via one end face each by means of a connecting arrangement. The individual laminated core layers of the laminated core arrangement can be connected by riveting or screwing.

The published German patent application DE 10 2011 115 159 A1 relates to a ring element for an electric machine. The first ring segment and at least one second ring segment are connected to one another to hold at least one magnet of the electric machine. The ring segments are connected to one another by means of the magnet. Furthermore, connecting elements interacting in a form-fitting manner can be formed at the joints of the adjacent ring segments.

The published German patent application DE 10 2012 019 182 A1 relates to a connection arrangement of at least one first ring segment on at least one second ring segment of a ring element for an electric machine. In the axial direction, the ring segments are mutually fixed by means of at least one plastic deformation of the ring segments of the ring element.

The published German patent application DE 10 2013 000 404 A1 relates to a rotor with a splittable core for an electric motor. A rotor has a circular carrier element and a plurality of shaft sections which are positioned on the carrier element in a circumferential direction at regular intervals. Of the plurality of split cores, each has a hole section that is matched to each of the shaft sections. By annularly joining the split cores, a generally circular core is formed. Each split core has connecting sections at both of its circumferential ends, and each connecting section is configured to be connected to a connecting section of an adjacent split core.

The published German patent application DE 10 2013 204 790 A1 discloses a rotor arrangement. The assembly comprises a hub and a rotor core having a first rotor core lamination positioned at least partially around the hub. The first rotor core lamination is at least partially defined by a first segment and a second segment, which are designed to be connected or interlocked with one another. The first segment comprises a protrusion that extends from a first body. The protrusion is designed to engage in a corresponding notch in the second segment to connect the first segment to the second segment. At least one first mounting tab extends from the first body and is designed to engage in a corresponding first groove on an outer periphery of the hub to connect the first segment to the hub.

The published German patent application DE 10 2015 206 974 discloses a rotor for an electric machine with at least one first rotor segment and at least one second rotor segment. The two rotor segments are connected to one another in a form-fitting manner at the respective end faces, so that a circular rotor can be formed. The first rotor segment and the second rotor segment are connected in a form-fitting manner to a rotor carrier along their inner circumference, wherein the first rotor segment and the second rotor segment each have a plurality of first receiving openings at their inner circumference and the rotor carrier can be mounted.

The European patent EP 2 466 732 B1 discloses a manufacturing method for a laminated rotor body. The band-shaped core laminations have a plurality of pole sections which protrude radially outward. Around a ring shape forming section, each is bent in a spiral shape. The band-shaped core laminations are laid one atop the other in such a way that the pole sections are aligned with one another.

The published German patent application DE 10 2017 201 438 discloses a laminated core disc for the rotor of an electric machine. The laminated core disc comprises a plurality of laminated core disc segments, wherein each laminated core disc segment has a connecting element at a first distal end and a mating connecting element at a second distal end opposite the first distal end for form-fitting connection with the connecting element of a further laminated disc segment to produce the laminated core disc. A magnet receiving recess for forming a magnet receiving pocket for receiving a magnet is formed on the end faces of the two distal ends of each laminated core disc segment.

The published Japanese patent application JP 2012-019623 A1 relates to a rotor core in which a plurality of segmental parts are coupled to form a ring by means of a form-fitting connection. The rotor core is configured by laminating a plurality of segmental parts. A plurality of permanent magnets are embedded to extend in the lamination direction of the core pieces so that the magnets are arranged at intervals in the circumferential direction.

The Chinese utility model CN 207939332 U discloses an electric machine. A rotor core is mounted on a rotating shaft. An imbalance of the motor can be compensated via a filler opening.

The Chinese utility model CN 207339463 U discloses a permanent magnet rotor.

The Japanese patent application JP H08168222 discloses a rotor for synchronous motors. The rotor consists of a large number of permanent magnets which are arranged on the circumference of a rotor shaft. A large number of core elements hold the individual permanent magnets between them in the circumferential direction.

The German translation DE 50 2016 003 319 T1 of the European patent EP 3 306 786 B1 discloses an electric motor. The rotor has a rotor shaft onto which a rotor pack is fitted and connected to the rotor shaft in a non-rotatable manner. The rotor pack consists of rotor segments stacked on top of one another in the axial direction and a centering disc as well as a press-fit connecting means. The stack formed from the rotor segments is arranged between the centering disc and the press-fit connection means.

According to the prior art, the individual laminations of the rotor stack (rotor stacks) are designed as solid rings due to the assembly methods, such as transverse interference fit, screwing, riveting and the like. However, this means extremely high punching waste in the production of these individual laminations.

SUMMARY

It is therefore the objective is to create a laminated rotor core for a rotor of a permanently excited electric machine, which can be manufactured in a resource-saving manner, is easy to assemble, requires a reduced number of different parts and ensures operational reliability of the rotor.

This object is achieved by a laminated rotor core for a rotor of a permanently excited electric machine, which comprises one or more of the features disclosed herein.

A further object is to provide a method for producing a laminated rotor core for a rotor of a permanently excited electric machine, which makes do with a reduced number of different parts and simplifies the manufacturing process for the rotor.

This object is achieved by a method for producing a laminated rotor core for a rotor of a permanently excited electric machine, which comprises one or more of the features disclosed herein.

One possible embodiment of a laminated rotor core for a rotor of a permanently excited electric machine according to the disclosure is characterized by the fact that each circular segment has a plurality of receiving openings for permanent magnets arranged in pairs and in a V-shape relative to one another punched out or cut out. Furthermore, a plurality of passages are formed, wherein a fixing means of the laminated rotor core is guided in each of the passages. The receiving openings for permanent magnets and the plurality of passages for fixing means are arranged symmetrically about a central axis of the circular segment and homogeneously along an arc length of the circular segment. The number of receiving openings in pairs is greater than the number of passages.

The greatest advantage is provided by additional segmentation of the rotor laminations of the laminated rotor core in combination with the fixing means guided through corresponding passages of the laminated rotor core. Fixing means such as screws or rivets are preferred. These improvements are evenly distributed radially in a segment depending on the number of pairs of magnetic poles to be received in the laminated rotor core and the number of screws to be used. This enables a significantly higher utilization of the punched metal sheet to be achieved. Since all segments consist of the geometrically identical punched part, each of the segments can be installed in any position in the laminated rotor core. This keeps handling and logistics simple.

According to an advantageous embodiment, the first connection system has formed a first connecting element, a second connecting element and a third connecting element, which differ in their shapes. The second connection system has formed a first complementary connecting element, a second complementary connecting element and a third complementary connecting element, which differ in their shapes. To connect the individual segments to a closed circular ring, the first connecting element interacts with the first complementary connecting element of a subsequent circular segment, the second connecting element interacts with the second complementary connecting element of the subsequent circular segment and the third connecting element with the third complementary connecting element of the subsequent circular segment in a form-fitting manner.

According to a possible embodiment of the stacked lamination rings consisting of the circular segments, the passages in the laminated rotor core are arranged in such a way that the passages are aligned and a fixing means runs in each of the passages of the laminated rotor core. The fixing means can all be fixed to a holding disc for the laminated rotor core.

By using a fixation by means of screws or rivets, full rings (continuous lamination rings) are no longer required. The segmentation of the laminated rotor core (rotor stack) in combination with the screwing or riveting mentioned above provides the greatest advantage. These improvements depend on the number of pairs of magnetic poles and the screws or rivets to be used per segment. The screws or rivets are evenly distributed radially and promise significantly higher utilization of the metal sheet from which the individual segments are punched. Since all segments consist of the geometrically identical punched part, the segment can be installed as desired and in any position in the rotor, which keeps handling and logistics simple.

According to a possible embodiment of the disclosure, the lamination rings consisting of the circular segments are stacked individually or in groups in such a way that the joints of the lamination rings are aligned in the direction of an axis of the laminated rotor core.

According to a possible further embodiment of the disclosure, the lamination rings consisting of the circular segments are stacked in such a way that the joints of all lamination rings are offset from one another by half an angular amount of the circular segment.

According to yet another embodiment of the disclosure, the lamination rings consisting of the circular segments are stacked in groups. In each group, the lamination rings consisting of the circular segments are arranged in such a way that the joints between the lamination rings are aligned in the direction of an axis of the laminated rotor core. The groups are arranged in the laminated core stack in such a way that the joints in the direction of the axis of successive groups are offset from one another by half an angular amount of the circular segment.

When stacking the lamination rings from the individual, circular segments, there are various possible concepts, as described above, for example (end-to-end, or alternately segmented). The connection of the individual segments to the lamination ring can, for example, be performed in a form-fitting manner. The position of the individual segment levels can be changed after each individual laminated core layer in order to distribute the joints in the best possible way, which entails a high level of handling effort. An alternative embodiment would be to stack a certain number of segmented lamination rings in a group. The resulting group of segmented lamination rings (a plurality of individual lamination rings) can be rotated relative to a subsequent group. The joints are not rotated within the individual lamination rings of the group, but form a good compromise between handling and minimizing losses.

According to possible embodiments of the segmented lamination ring of the present disclosure, the same can be composed of three segments or of five segments. The number of segments per lamination ring essentially depends on the number of passages and the number of receiving openings for permanent magnets per segment. In addition, the number of passages and the number of receiving openings for permanent magnets should be homogeneously distributed over the circumference of the segmented lamination ring.

The core idea of the present disclosure lies in the "keyhole connection" (form-fitting connection) of the individual segments in the lamination ring and the rotating of the successive lamination rings ("masonry" function of the successive lamination rings).

According to a possible exemplary embodiment of the disclosure, the lamination ring can comprise 3 circular segments of 120 degrees each. In a tool, the individual circular segments are clinched to form a lamination ring. Two successive lamination rings are then rotated by half the number of degrees of the circular segment. As a result, each individual lamination ring or group of lamination rings is rotated by 60 degrees relative to the adjacent lamination rings or each group of lamination rings. In this, the passages for the fixing means and the receiving openings for the permanent magnets are aligned. This rotation creates the "masonry function" mentioned above.

According to the method according to the disclosure for producing a laminated rotor core for a rotor of a permanently excited electric machine, a plurality of circular and identical segments are first punched out of a metal sheet. Here, each of the circular segments has a connection system in the circumferential direction on a first end face and a complementary connection system on a second end face. Similarly, a plurality of receiving openings for permanent magnets arranged in a V-shaped manner relative to one another in pairs, and a plurality of passages for one fixing means each are formed on each of the identical segments. A lamination ring can be formed from a defined number of the plurality of circular and identical segments (e.g. by clinching of the segments). For this purpose, the connection system of the first end face of a circular segment interacts with the complementary connection system on the second end face of the subsequent circular segments in a form-fitting manner. The lamination rings completed from the circular segments are stacked in such a way that the receiving openings for permanent magnets and the passages for the fixing means of all the lamination rings stacked in the laminated rotor core are aligned. According to one possible embodiment, the laminated rotor core can be fixed to a holding disc by one fixing means each through one of the passages of the laminated rotor core.

The advantage of the method according to the disclosure is that no completely cylindrical rotor carrier is required for fixing (screwing or riveting) the laminated rotor core. It is sufficient if only one centering seat is formed for the laminated rotor core. The centering can also performed completely during the assembly of the laminated rotor core using a suitable tool.

Another embodiment can be to completely omit the rotor carrier as a tubular carrier element and to fasten the laminated rotor core to a holding disc. Other parts of a hybrid module can also be attached to it. The holding disc could also be used as a pressure plate for the clutch. This increases the proportion of functional integration and the radial installation space opened up could be used to increase the torque of the electric machine.

A further advantage of the method according to the disclosure is the deformation of the assembly, which is caused only by the centrifugal force. The fastening method of screwing/riveting does not cause any deformation, as is the case, on the other hand, with a transverse interference fit.

BRIEF DESCRIPTION OF THE DRAWINGS

With reference to the accompanying drawings, the disclosure and its advantages will now be explained in more detail by means of exemplary embodiments, without thereby limiting the disclosure to the exemplary embodiment shown. The proportions in the figures do not always correspond to the real proportions, since some shapes are simplified and other shapes are shown enlarged in relation to other elements for better illustration.

DETAILED DESCRIPTION

Identical reference symbols are used for elements of the disclosure that are the same or have the same effect. Furthermore, for the sake of clarity, only reference symbols are shown in the individual figures that are necessary for the description of the respective figure. The figures merely represent exemplary embodiments of the disclosure without, however, restricting the disclosure to the exemplary embodiments shown.

Figure 1:
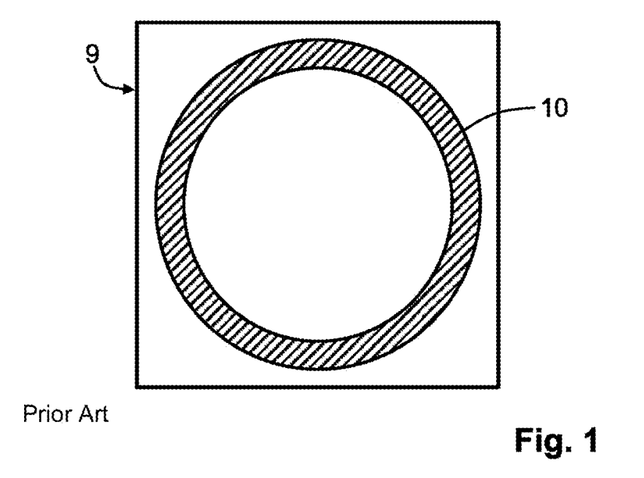
FIG. 1 shows a plan view of a metal sheet from which a lamination ring is punched out according to the prior art for a laminated rotor core.
Figure 2:
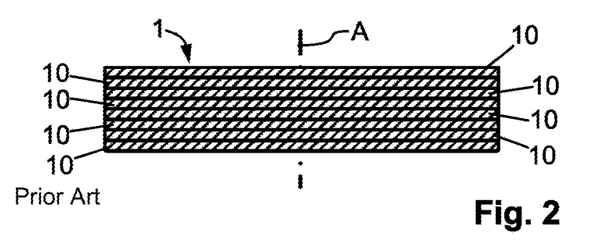
FIG. 2 shows a side view of the laminated rotor core formed from a plurality of lamination rings of FIG. 1.

FIG. 1 shows a plan view of a metal sheet 9, from which a lamination ring 10 according to the prior art is punched for the removal of a laminated rotor core 1. In FIG. 2, a side view of the laminated rotor core 1 is shown, which is formed from the plurality of lamination rings 10 according to the prior art. Due to the assembly conditions, such as, for example, transverse interference fit, screwing, riveting and the like, the lamination rings 10 of the laminated rotor core 1 are designed as full rings. However, this means extremely high punching waste in the production of these full rings (individual cores).

Figure 3:
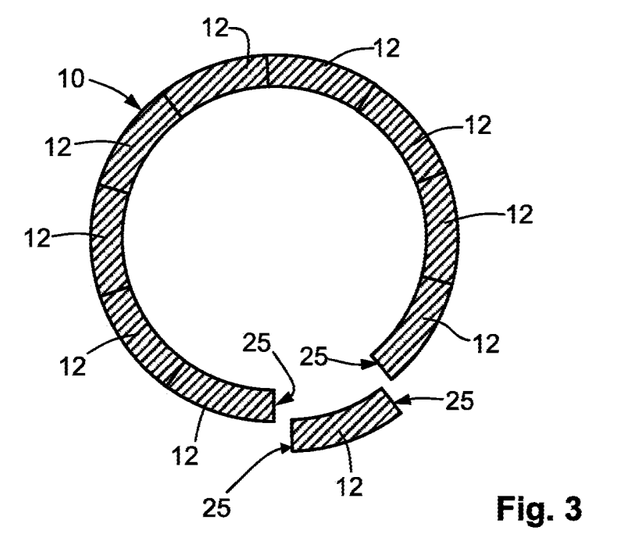
FIG. 3 shows a schematic plan view of a lamination ring which is formed from a plurality of circular segments.
Figure 4:
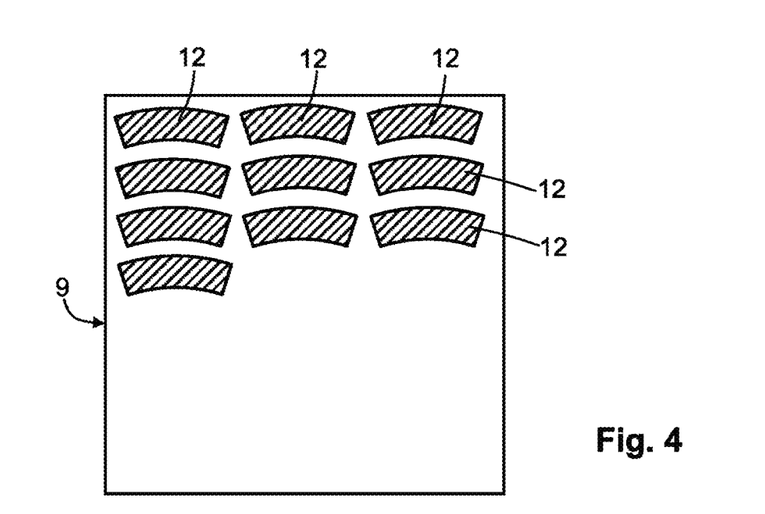
FIG. 4 shows a schematic plan view of a metal sheet; from which, according to the disclosure, the circular segments for the lamination ring of FIG. 3 are punched out.

FIG. 3 shows a schematic plan view of a lamination ring 10 which is formed from a plurality of circular ring segments 12. FIG. 4 shows a schematic plan view of a metal sheet 9, from which, according to the disclosure, the circular ring segments 12 for the lamination ring 10 of FIG. 3 are punched out. All of the punched out circular ring segments 12 are identical. The lamination ring 10 is created from the circular ring segments 12. The arrangement of the circular ring segments 12 enables a significantly higher utilization of the metal sheet 9. It is possible, for example, to use a punching tool (not shown) with a plurality of nests, or to move the metal sheet 9 under the punching tool. All circular ring segments 12 are designed to be geometrically identical.

Figure 5:
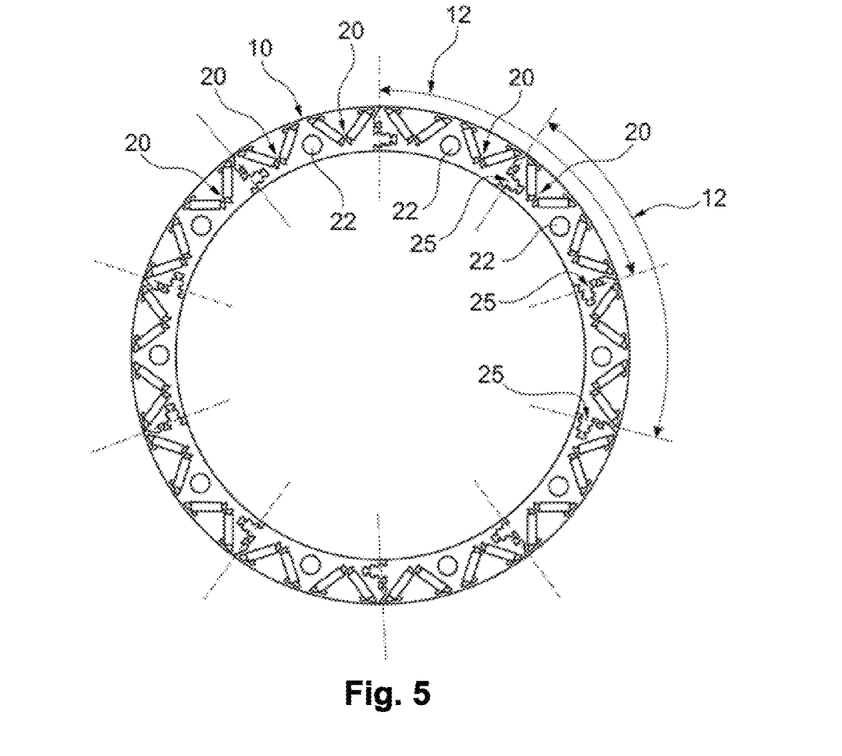
FIG. 5 shows a plan view of a lamination ring which is formed from a plurality of circular segments according to the disclosure.

FIG. 5 shows a plan view of two lamination rings 10 arranged one above the other, both of which are formed from a plurality of circular ring segments 12 according to the disclosure. The plan view shows two segment levels. The circular ring segments 12 of the upper lamination ring 10 are identified by the dashed lines. The circular ring segments 12 of the lower lamination ring 10 are identified by the dashed-dotted lines. The passages 22 for the fixing means (not shown here) and the receiving openings 20 arranged in pairs for the permanent magnets are distributed in a rotationally symmetrical manner on each of the lamination rings 10. In the embodiment shown here, each of the lamination rings 10 consists of five circular segments 12. The upper lamination ring 10 is rotated by half an angular range (arc length B) of the circular segment 12 relative to the lower lamination ring 10. From FIG. 5 it can be clearly seen that, despite the rotation, the passages 22 of the stacked two lamination rings 10 consisting of the circular segments 12 are in alignment. Likewise, the receiving openings 20 for permanent magnets, arranged in pairs (not shown here), are aligned. By rotating the upper lamination ring 10 relative to the lower lamination ring 10, the joints 25 between the circular segments 12 of the upper lamination ring 10 and the circular segments 12 of the lower lamination ring 10 are correspondingly rotated.

Figure 6:
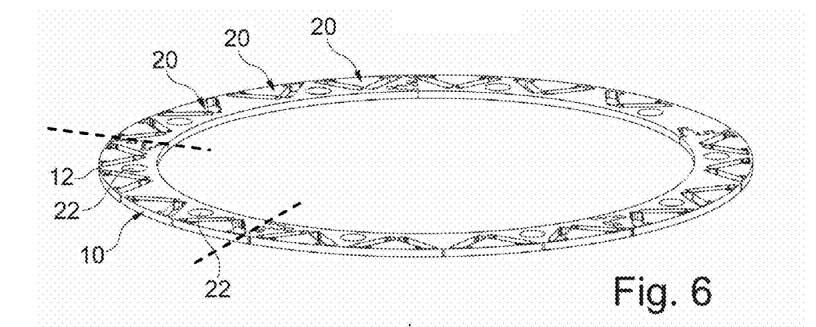
FIG. 6 shows a perspective view of the lamination ring formed from the plurality of circular segments according to the disclosure.

FIG. 6 shows a perspective view of the lamination ring 10 formed from a plurality of circular ring segments 12 according to the disclosure. The dashed lines mark one of the plurality of circular ring segments 12. Likewise, the receiving openings 20 and the passages 22, which are evenly distributed along the circumference of the lamination ring 10 and are arranged in pairs, can be seen.

Figure 7:
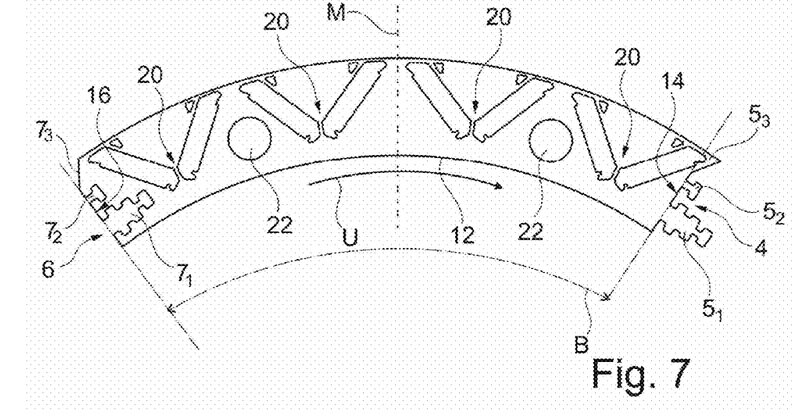
FIG. 7 shows a plan view of a circular segment according to the disclosure.

FIG. 7 shows a plan view of a possible embodiment of a circular segment 12 according to the disclosure. Each circular segment 12 has a first end face 14 with a connection system 4 in the circumferential direction U. The circular segment 12 also has a second end face 16. The first end face 14 has a connection system 4 that is formed during the punching process. A connection system 6 complementary to the connection system 4, which is also formed during the punching process, is formed on the second end face 16.

In the embodiment shown here, which should not be understood as a limitation of the disclosure, the first connection system 4 consists of a first connecting element $5_1$, a second connecting element $5_2$ and a third connecting element $5_3$, which differ in their shape. The second connection system 6 consists of a first complementary connecting element $7_1$, a second complementary connecting element $7_2$ and a third complementary connecting element $7_3$, which also differ in their shape. The first connecting element $5_1$ interacts with the first complementary connecting element $7_1$ of a subsequent circular segment 12 in a form-fitting manner. The second connecting element $5_2$ interacts with the second complementary connecting element $7_2$ of the subsequent circular segment 12 in a form-fitting manner. The third connecting element $5_3$ interacts with the third complementary connecting element $7_3$ of the subsequent circular segment 12 in a form-fitting manner.

Each of the circular segments 12 has formed punched out receiving openings 20 for permanent magnets and the plurality of passages 22, which are arranged symmetrically around a central axis M of the circular segment 12. Furthermore, the receiving openings 20 for permanent magnets and the plurality of passages 22 are arranged homogeneously along an arc length B of the circular segment 12.

Figure 8:
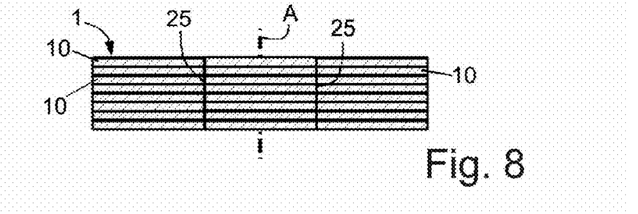
FIG. 8 shows a side view of the laminated rotor core, which according to one embodiment is formed from a plurality of segmented lamination rings of FIG. 5.

FIG. 8 shows a side view of the laminated rotor core 1, which according to one embodiment is formed from a plurality of segmented lamination rings 10 of FIG. 5. The lamination rings 10 consisting of the individual circular segments 12 assembled according to the disclosure are stacked individually or in groups in such a way that the joints 25 of all the lamination rings 10 are aligned in the direction of an axis A of the laminated rotor core 1.

Figure 9:
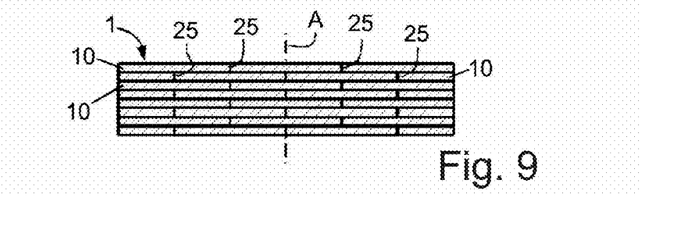
FIG. 9 shows a side view of the laminated rotor core, which according to a further embodiment is formed from a plurality of segmented lamination rings of FIG. 5.

FIG. 9 shows a side view of the laminated rotor core 1, which according to a further embodiment is formed from a plurality of segmented lamination rings 10 of FIG. 5. The lamination rings 10 consisting of the circular segments 12 can be stacked individually or in groups. In the embodiment shown here, the lamination rings 10 are stacked in such a way that the joints 25 of all the lamination rings 10 of the laminated rotor core are offset from one another by half an angular amount of the circular segment 12.

Figure 10:
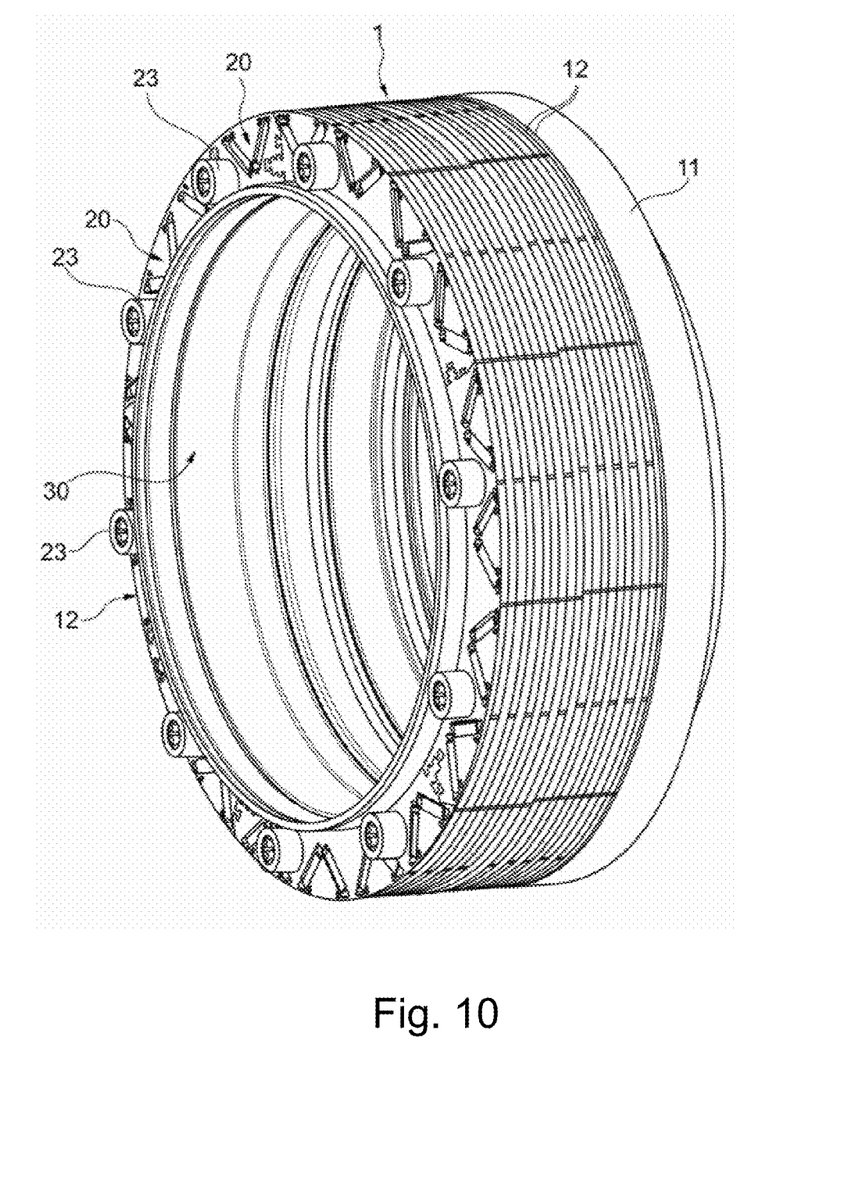
FIG. 10 shows a perspective view of an assembled laminated rotor core.

FIG. 10 shows a perspective view of an assembled laminated rotor core 1. In the embodiment shown here, screws are used as fixing means 23 to fix the lamination rings 10 of the laminated rotor core 1 consisting of the circular segments 12 (see FIG. 7) to a holding disc 11. By using a screw connection or riveting, the lamination rings 10 consisting of the circular segments 12 (see FIG. 7) can be used. A cylindrical rotor carrier 30 can be used to stack the individual lamination rings 10, which merely provides a centering seat for the lamination rings 10. Thus, a completely cylindrical rotor carrier 30 is no longer necessary for the assembly of the lamination rings 10. As mentioned above, the individual lamination rings 10 are stacked in such a way that the passages 22 for the fixing means 23 and the receiving openings 20 for permanent magnets are aligned over the entire axial length of the laminated rotor core 1.

Figure 11:
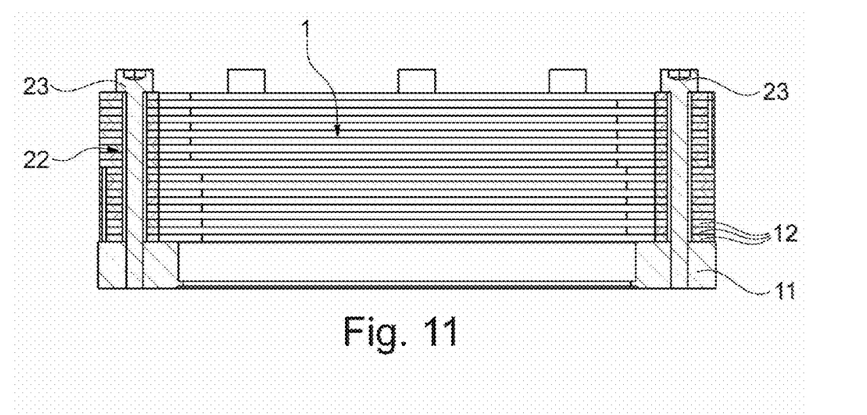
FIG. 11 shows a sectional view of an assembled laminated rotor core.
Figure 12:
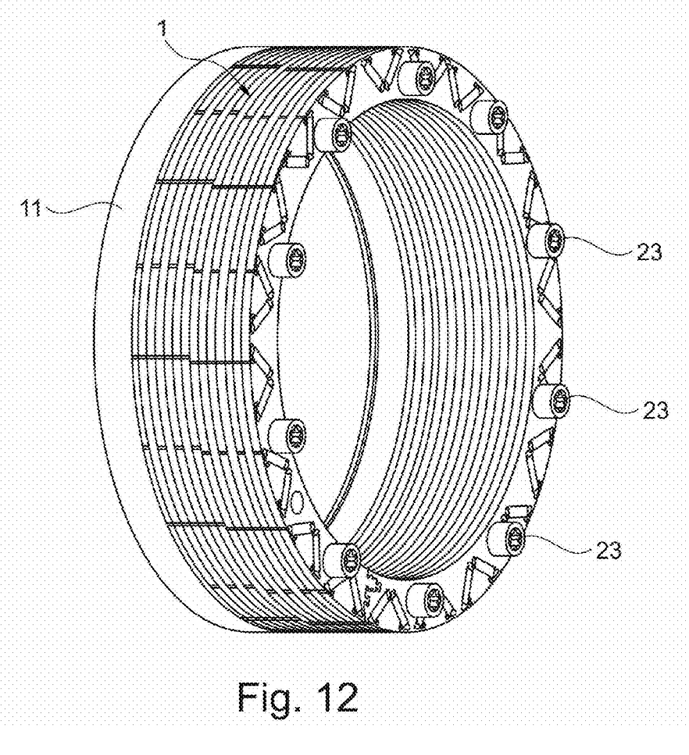
FIG. 12 shows a perspective view of an assembled laminated rotor core of FIG. 11.

FIG. 11 shows a sectional view of an assembled laminated rotor core 1 and FIG. 12 shows a perspective view of an assembled laminated rotor core 1 of FIG. 11. In the embodiment shown in FIGS. 11 and 12, the rotor carrier 30 as a tubular carrier element is omitted completely and the laminated rotor core 1 is fastened to the holding disc 11. As can be seen from FIG. 11, the fixing means 23 are designed as screws. The screws 23 run in the passages 22 of the stacked lamination rings 10 and interact with the holding disc 11 to fix the laminated rotor core 1.

It is believed that the present disclosure and many of the advantages noted therein will be understandable from the preceding description. It will be apparent that various changes in the shape, construction and arrangement of the components can be made without departing from the disclosed subject matter. The form described is illustrative only and it is the intent of the appended claims to embrace and incorporate such changes. Accordingly, the scope of the disclosure should be limited only by the appended claims.

LIST OF REFERENCE SYMBOLS

1 Laminated rotor core
4 Connection system
$5_1$ First connecting element
$5_2$ Second connecting element
$5_3$ Third connecting element
6 Complementary connection system
$7_1$ First complementary connecting element
$7_2$ Second complementary connecting element
$7_3$ Third complementary connecting element
9 Metal sheet
10 Lamination ring
11 Holding disc
12 Circular segment
14 First end face
16 Second end face
20 Receiving openings for permanent magnets
22 Passage
23 Fixing means
25 Joint
30 Rotor carrier
A Axis
B Arc length
M Central axis
U Circumferential direction

The invention claimed is:

1. A laminated rotor core for a rotor of a permanently excited electric machine, the laminated rotor core comprising:
a plurality of lamination rings, each of the lamination rings including a plurality of circular segments, and each of the circular segments has, in a circumferential direction, a first end face with a connection system and a second end face with a complementary connection system, the connection system includes first, second, and third connecting elements protruding from the first end face, and the complementary connection system includes first, second, and third complementary connecting elements recessed into the second end face;
wherein each said circular segment has a plurality of receiving openings, which are arranged in a V-shape relative to each other in pairs, configured for receiving permanent magnets; and
a plurality of passages defined in the circular segments, each configured for a fixing element of the laminated rotor core, are provided, wherein the receiving openings for the permanent magnets and the plurality of passages are arranged symmetrically about a central axis of the circular segment and homogeneously along an arc length of the circular segment, and wherein a number of the receiving openings in pairs in each individual circular segment is four and a number of the passages in each individual circular segment is two.

2. The laminated rotor core according to claim 1, wherein:
the first connecting element, the second connecting element, and the third connecting element differ in shape, the first complementary connecting element, the second complementary connecting element, and the third complementary connecting element differ in shape, and
the first connecting element interacts with the first complementary connecting element of a subsequent circular segment, the second connecting element interacts with the second complementary connecting element of the subsequent circular segment, and the third connecting element interacts with the third complementary connecting element of the subsequent circular segment in a form-fitting manner.

3. The laminated rotor core for the rotor according to claim 1, wherein the passages of the lamination rings formed of the circular segments are aligned and a respective fixing element extends through each of the passages of the laminated rotor core, all of which are fixed to a holding disc for the laminated rotor core.

4. The laminated rotor core for the rotor according to claim 3, wherein the fixing elements comprise screws or rivets.

5. The laminated rotor core for the rotor according to claim 1, wherein the lamination rings formed of the circular segments are stacked individually or in groups in such a way such that joints of the lamination rings are aligned in a direction of an axis of the laminated rotor core.

6. The laminated rotor core for the rotor according to claim 1, wherein the lamination rings formed of the circular segments are stacked individually or in groups in such a way such that joints of all of the lamination rings of the laminated rotor core or the joints of the groups of the laminated rings are offset from one another by half an angular amount of the circular segment.

7. The laminated rotor core for the rotor according to claim 1, wherein each said lamination ring of the laminated rotor core is comprised of three of the segments or of five of the segments.

8. A method for producing a laminated rotor core for a rotor of a permanently excited electric machine, the method comprising:
punching a plurality of circular and identical segments out of a metal sheet, so that each of the circular segments has formed in a circumferential direction on a first end face a connection system, on a second end face a complementary connection system, a plurality of receiving openings configured for permanent magnets arranged in pairs and in a V-shape relative to each other, and a plurality of passages for a fixing element, wherein a number of the receiving openings in pairs in each individual circular segment is larger than a number of the passages in each individual circular segment;
forming a lamination ring from at most five of the plurality of circular and identical segments by the connection system of the first end face of one said circular segment interacting in a form-fitting manner with the complementary connection system on the second end face of a subsequent of the circular segments, wherein the connection system includes first, second, and third connecting elements protruding from the first end face, and the complementary connection system includes first, second, and third complementary connecting elements recessed into the second end face;
stacking the lamination rings completed with the circular segments in such a way that the receiving openings for the permanent magnets and the passages for the fixing elements of all of the lamination rings stacked in the laminated rotor core are aligned; and fixing the laminated rotor core to a holding disc using a fixing element in each case through one of the passages of the laminated rotor core.

9. The method according to claim 8, wherein the lamination rings formed of the circular segments are stacked individually or in groups such that joints of the lamination rings of the laminated rotor core are aligned in a direction of an axis of the laminated rotor core.

10. The method according to claim 8, wherein the lamination rings formed of the circular segments are stacked individually or in groups in such a way such that joints of all of the lamination rings of the laminated rotor core or the joints of the groups are offset from one another by half an angular amount of the circular segment.

11. A laminated rotor core for a rotor of a permanently excited electric machine, the laminated rotor core comprising:
- a plurality of lamination rings, each of the lamination rings including a plurality of circular segments, and each of the circular segments has, in a circumferential direction, a first end face with a connector and a second end face with a complementary connector, the connector includes first, second, and third connecting elements protruding from the first end face, and the complementary connector includes first, second, and third complementary connecting elements recessed into the second end face;
- each said circular segment has a plurality of receiving openings, which are arranged in a V-shape relative to each other in pairs, configured for receiving permanent magnets; and
- a plurality of passages defined in the circular segments, each configured for a fastener used for assembling of the laminated rotor core, wherein the receiving openings for the permanent magnets and the plurality of passages are arranged symmetrically about a central axis of the circular segment and uniformly spaced along an arc length of the circular segment, and wherein each of the plurality of passages are positioned circumferentially between a pair of the receiving openings.

12. The laminated rotor core according to claim 11, wherein the first, second, and third connecting elements differ in shape from one another, and the first, second, and third complementary connecting elements are configured to respectively interact with the first, second, and third connecting elements of a subsequent circular segment in a form-fitting manner such that the circular segments are interconnected to one another.

13. The laminated rotor core for the rotor according to claim 11, wherein the passages of the lamination rings formed of the circular segments are aligned and a fastener extends through at least some of the passages of the laminated rotor core, all of which are fixed to a holding disc for the laminated rotor core.

14. The laminated rotor core for the rotor according to claim 13, wherein the fasteners comprise screws or rivets.

15. The laminated rotor core for the rotor according to claim 11, wherein the lamination rings formed of the circular segments are stacked individually or in groups such that joints between the circular segments of the lamination rings are aligned in a direction of an axis of the laminated rotor core.

16. The laminated rotor core for the rotor according to claim 11, wherein the lamination rings formed of the circular segments are stacked individually or in groups such that joints between the circular segments of all of the lamination rings of the laminated rotor core or the joints of the groups of the laminated rings are offset from one another by half an arc length of the circular segment.

17. The laminated rotor core for the rotor according to claim 11, wherein each said lamination ring of the laminated rotor core comprises three of the segments or five of the segments.

* * * * *